Sept. 22, 1959 W. F. GAYRING 2,905,777

TIMER

Filed Oct. 21, 1957

INVENTOR.
WALLACE F. GAYRING
BY
John P. Murphy
ATTORNEY

United States Patent Office 2,905,777
Patented Sept. 22, 1959

2,905,777

TIMER

Wallace F. Gayring, Minoa, N.Y.

Application October 21, 1957, Serial No. 691,327

1 Claim. (Cl. 200—38)

This invention relates to time controlled systems, and more particularly to an apparatus and method for automatically timing and controlling the operation of the control parts of machines having a series of operations.

Heretofore there have been presented many different devices and methods for timing the operations of machines, or for directing the formula of cycles of operations. One such method is the provision of a plastic disc in the order of a phonograph record, the disc being perforated in the desired formula, and being then rotated adjacent a series of air valves. The passage of air through the perforations of the disc actuates the appropriate mechanisms. Another method is to use a similar disc to interrupt light beams in a photoelectric apparatus. One of the most common methods is the provision of a disc adapted to receive detachable cam segments, pins or the like for the actuation of suitable switches and mechanical linkages. Yet another method is in the use of a segmented plastic or Bakelite disc. The segments are adapted to be broken away as the timing formula requires, so that switches may be actuated thereat.

Devices using the air valves involve complicated apparatus, with intricate pipe systems for the conveyance of the air through the valves and into the appropriate actuating mechanisms. As is well known to those skilled in the art, photoelectric systems are inherently delicate and require extreme care in their use. Further, they are not well adapted for use where any great amount of vibration is apt to be present. Both of the above systems, using a plastic or other card or disc require periodic replacement of the disc due to the wearing out of the non-durable material. The system employing detachable cam segments or pins is both rugged and durable. However, this system is inflexible to an extent, and is therefore only partially adapted to the changing of a given formula for another. The system using break-away segments is both non-durable and inflexible. Once a formula has been set up, it is impossible to bend back or otherwise restore any segment thus broken away in the interest of changing the formula.

It is therefore the leading object of this invention to provide a timer disc having semi-flexible segments which are adapted to be bent back into place in order to change a given timing formula.

It is another object of the invention to provide a timer disc having the utmost of flexibility with respect to lengthening, shortening, or otherwise changing a given timing formula.

It is a further object to provide a timing disc which is durable and rugged, being adapted for long wear and, at the same time, usage in adverse operating conditions.

In accordance with this invention, a disc is provided for timing of cyclic operations, the disc being adapted to be set for any given formula of time. Switches of any suitable type are employed for actuation by the disc, as the disc is rotated around an axis by a timing motor. A given on or off period of actuation of a switch may be set to any length of time according to needs. The disc is adapted to be used with more than one switch, or it may be used in combination with other discs, each one having a different formula for a different series of operations.

The foregoing objects and other advantages of this invention are explained with more particularity in the following specification when taken with reference to the accompanying drawings in which.

Figures 1, 2, 3, 4:
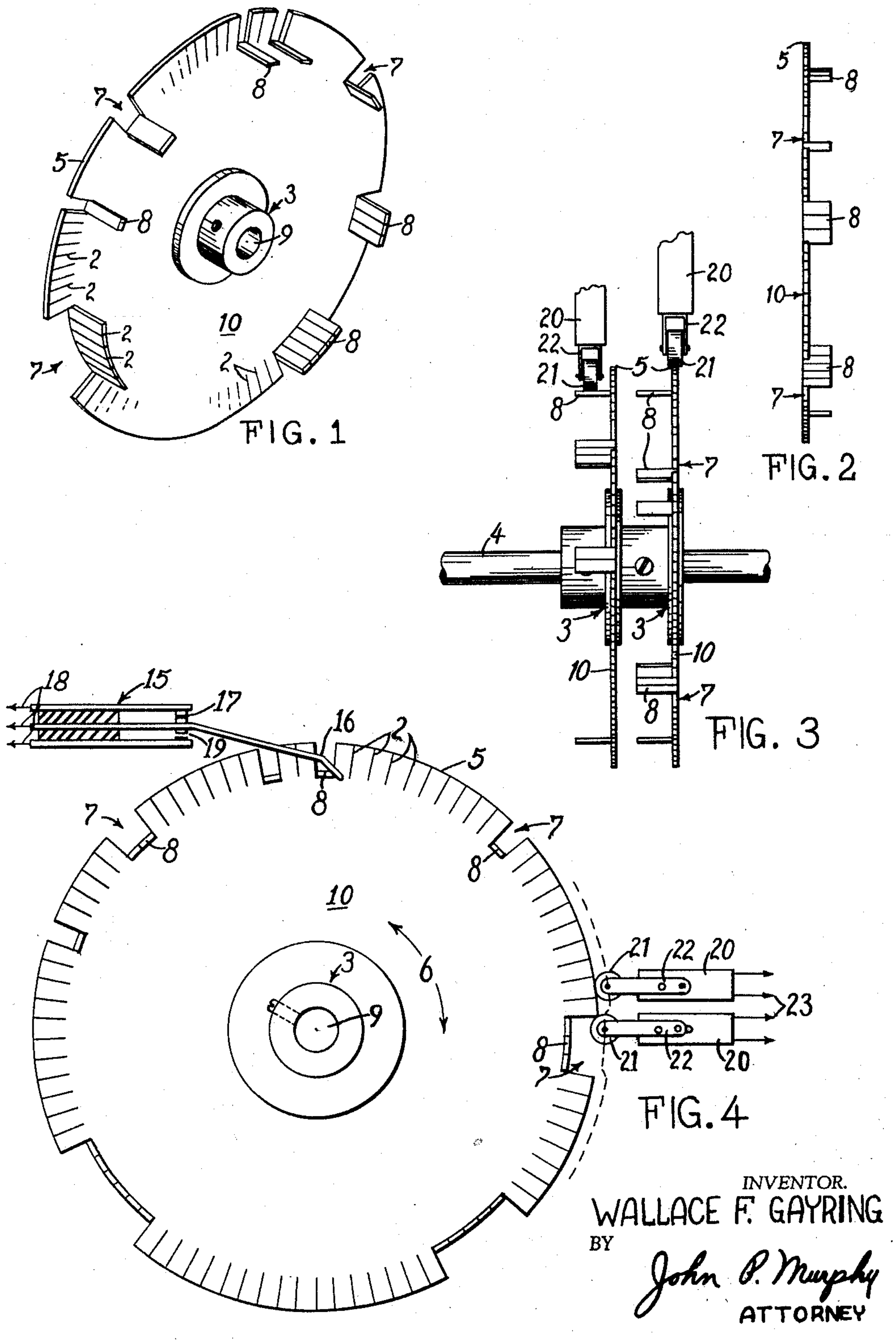
Figure 1 is perspective view of the invention.
Figure 2 is a side view of the invention.
Figure 3 is a side view illustrating the use of a plurality of discs according to this invention.
Figure 4 is a front view of the invention, illustrating its use.

As shown in the drawings, a timer disc of substantially round form is provided, designated by the numeral 10. The disc 10 is made of preferably sheet metal having the property of flexibility to a limited extent, yet being inherently rigid. A series of equally spaced radial cuts 2 extend inwardly from the outer periphery 5 on a radius with the center, the cuts extending in series around the entire circumference of the disc. The disc 10 is provided with any suitable center hole 9, adapted to receive the shaft 4 of the timing motor (not shown). While Figure 4 illustrates a definite number of cuts 2, it is to be understood that the spacing of the cuts and the number of cuts made thereby are not constants, and may vary according to requirements, or the speed of the rotation of the discs may be altered by the speed of the timer motor.

A series of segments 8 are formed by and between each of the radial cuts 2. The segments are adapted to be bent over as shown in the drawings, thus forming a space 7 corresponding to the places where each of the segments 8 are bent over. More or less segments may be bent over as required by needs to lengthen or shorten the time of the formula.

With reference to Figure 3, two discs 10 are shown disposed on a shaft 4 of a timer motor (not shown). The discs are held against rotation with respect to the shaft 4 by means of suitable collar assemblies 3, pinned to the shaft by set screws or the like, the whole of conventional type. Segments 8 are bent over in the required formula, leaving corresponding spaces 7. A switch 20 is maintained in operative relationship with each of the timer discs 10. Each switch 20 has a supporting element 22 supporting a contact roller 21. The roller 21 engages the disc 10 operatively. The switches are of the type which are normally off, and are actuated momentarily on, or conversely. These switches are of conventional type, well known in the art, and will not be described further.

One switch is disposed so that the roller 21 engages the outer periphery 5 of disc 10. As the disc 10 rotates, any aforementioned space 7 comes into alignment with roller 21. Assuming that switch 20 is normally off as its roller 21 rides on the periphery 5 of disc 10, with the roller axis travelling substantially along the dotted line, the switch 20 will be actuated to the on position as the roller drops into space 7, thereby supplying current to the appropriate controlled circuit. As the disc 10 continues to rotate, space 7 travels past the roller 21, which then rides back up on the periphery 5, shutting off the switch. This is also illustrated in Figure 4, two switches 20 being shown to illustrate the relative positions of the roller 21 with respect to the space 7 and the periphery 5. Wires 23 carry current to and from the switch for controlling the circuits of the controlled apparatus.

In Figure 3, an alternate location of switch 20 is illustrated as maintaining the switch so that it rides on the bent over segments 8. Again, assuming that the switch is normally off, it will be seen that the switch will operate conversely to the operation described hereinabove, where a switch is disposed in engagement with the periphery 5 of the disc 10. In the case where the switch is disposed to engage the bent over segments 8, it will be seen that the switch will be on except when a segment 8 comes into alignment with the roller 21. At that time the roller 21 will ride up and over the segment or segments and will be in the off position for that time.

It is obvious that switches may be employed which are normally on, or normally off, or are of the double or multiple pole type. In the latter type, one circuit is normally closed. When the switch is thrown or otherwise actuated, the one circuit is opened, and another is closed. It will be further obvious that any plurality of discs 10 may be turned on the same shaft, each having a separate formula for controlling different functions of cycle, and each having one or more switches operated thereby.

Figure 4 discloses the use of a different type switch. Switch 15 is of the leaf type, having a finger 16 attached to one of the leaves of the switch. The finger 16 is normally of spring steel or other flexible material. The switch 15 illustrated is of the single pole, double throw type, having a common wire adapted to be thrown to either of two circuits. Wires 18 lead to the controlled apparatus (not shown). Switch 15 is illustrated as having a flexible finger 16 adapted to ride over any bent-over segment 8 for actuation of the switch. As finger 16 is engaged by a segment 8 (as illustrated), contacts 17 are closed. After the segment 8 passes out of engagement with finger 16, the leaf will spring back, opening contacts 17, and closing contacts 19, thus opening one circuit and closing another. This switch may also be mounted to ride on the periphery 5 of the disc 10, so as to operate conversely to the manner illustrated.

This invention finds particular usefulness in apparatus such as commercial laundry and dry cleaning equipment, where it is often desired to change the formula of the timing, for controlling the cycle of operation according to varying loads being placed in the machine.

The illustrations of various switches and their relationship to the timer disc 10 are merely for the purpose of illustration, and constitute no part of the invention per se.

This invention is concerned solely with the disc having the segments adapted to be bent over in any required formula, and having the quality of being adapted to be bent back into place in order that the formula may be altered. The disc is interchangeable with like discs, and may be mounted with the bent over segments facing either direction, or the segments may be bent over in either direction. The disc is adapted to be rotated in any direction, as shown by arrow 6 in Figure 4, except when used with a leaf switch, where the disc may be rotated in only one direction. The length of time for a given formula is regulated through the speed of rotation of the disc, as well as the number of segments bent over. The size of the segments is also important in determining the length of time in a formula. When it may be required to shorten or lengthen formula time, segments already bent over may be straightened, thus broadly adjusting the time. The speed of rotation of the disc may then be varied to further adjust the time.

It is thereby seen that a rotatable disc for a timing apparatus is provided having the utmost flexibility of the timing formula, due to the nature of the segments of the disc, as hereinabove described.

The structure described herein is for the purpose of illustration only, and further modifications may be made which fall fairly within the spirit and scope of the appended claim, which is not to be limited to the structure shown.

What is claimed is:

For use in a control system, a thin control disc of a bendable material, restorable to its original shape for timing cyclic operations, said disc including mounting means thereon for mounting the same on a rotary shaft, said disc including a circumferential timing-edge portion for engaging switch means to afford one cyclic control, a plurality of circumferentially spaced, radial cuts extending from said timing-edge portion toward the center of said disc and terminating short thereof, bendable segments formed by adjacent radial-cuts and portionable laterally to at least one side of said disc in a predetermined pattern for engaging additional switch means on said one side of the disc for providing additional cyclic control upon rotation of said disc about its center.

References Cited in the file of this patent

UNITED STATES PATENTS

| | | |
|---|---|---|
| 1,801,129 | Warren | Apr. 14, 1931 |
| 1,856,832 | Halvorson | May 3, 1932 |
| 2,236,299 | Reid | Mar. 25, 1941 |
| 2,555,994 | Pennell | June 5, 1951 |
| 2,671,148 | Schulenburg | Mar. 2, 1954 |
| 2,844,670 | Witte | July 22, 1958 |